(12) United States Patent
Floris et al.

(10) Patent No.: US 10,823,637 B2
(45) Date of Patent: Nov. 3, 2020

(54) DEVICES, SYSTEMS AND METHODS FOR USE IN FIBER MEASUREMENTS, SUCH AS MULTI-MODE FIBER GEOMETRY MEASUREMENTS

(71) Applicant: CommScope Asia Holdings B.V., DG Bussum (NL)

(72) Inventors: Sander Johannes Floris, EC Lennisheuvel (NL); Ton Bolhaar, BP Ophemert (NL); Bastiaan Pieter De Hon, DB Eindhoven (NL)

(73) Assignee: COMMSCOPE ASIA HOLDINGS B.V., DG Bussum (NL)

( * ) Notice: Subject to any disclaimer, the term of this patent is extended or adjusted under 35 U.S.C. 154(b) by 0 days.

(21) Appl. No.: 15/524,891

(22) PCT Filed: Nov. 9, 2015

(86) PCT No.: PCT/EP2015/076048
§ 371 (c)(1),
(2) Date: May 5, 2017

(87) PCT Pub. No.: WO2016/071530
PCT Pub. Date: May 12, 2016

(65) Prior Publication Data
US 2017/0343450 A1 Nov. 30, 2017

Related U.S. Application Data

(60) Provisional application No. 62/077,036, filed on Nov. 7, 2014.

(51) Int. Cl.
*G01M 11/08* (2006.01)
*G01M 11/00* (2006.01)
*G01N 21/01* (2006.01)

(52) U.S. Cl.
CPC .......... *G01M 11/088* (2013.01); *G01M 11/33* (2013.01); *G01N 21/01* (2013.01)

(58) Field of Classification Search
CPC .... G01M 11/088; G01M 11/33; G01N 21/01; G01B 5/0002; G01B 11/00; G01B 11/12; G01B 11/27; G01B 11/272; G02B 6/3843
See application file for complete search history.

(56) References Cited

U.S. PATENT DOCUMENTS

| | | | | |
|---|---|---|---|---|
| 4,215,937 A | * | 8/1980 | Borsuk | G02B 6/3843 356/400 |
| 4,441,026 A | * | 4/1984 | Moriwaki | G01B 5/0002 250/559.35 |

(Continued)

FOREIGN PATENT DOCUMENTS

EP 2 423 660 A1 2/2012

OTHER PUBLICATIONS

International Search Report and Written Opinion of the International Searching Authority for corresponding International Patent Application No. PCT/EP2015/076048 dated Jan. 28, 2016, 12 pgs.

*Primary Examiner* — Mohamed K Amara
(74) *Attorney, Agent, or Firm* — Merchant & Gould P.C.

(57) ABSTRACT

A method for testing optical fibers includes using an optical testing instrument to measure a characteristic, such as clad non-circularity, of an optical fiber at a multiple angles of rotation of an optical fiber around its optical axis. From the measurements data points indicative of measured values of the characteristic at the respective angles of rotation are generated. A model is created of the optical fiber having the characteristic as a variable parameter, and from the model a functional relationship between an expected measured value of the characteristic and the angle of rotation and the variable parameter is generated. By varying the parameter a fit of the functional relationship to the data points is made (Continued)

(a)

(b)

(c)

according to one or more predetermined criteria, such as least-squares fit. The value of the characteristic can be found based on the fit. Instrumental parameters, such as fiber misalignment and cleave angle, can also be ascertained by the method.

9 Claims, 15 Drawing Sheets

(56) References Cited

U.S. PATENT DOCUMENTS

| | | | | |
|---|---|---|---|---|
| 4,468,118 A * | 8/1984 | Bice | ............... | G01N 21/412 356/128 |
| 4,563,087 A * | 1/1986 | Bourbin | ............... | G01B 11/00 356/73.1 |
| 4,572,665 A * | 2/1986 | Benoit | ............... | G01N 21/412 356/128 |
| 4,779,978 A * | 10/1988 | Hatton | ............... | G01M 11/35 356/128 |
| 4,994,679 A * | 2/1991 | Esser | ............... | G02B 6/3843 250/227.24 |
| 5,131,745 A * | 7/1992 | Whitney | ............... | B24B 19/226 356/153 |
| 5,140,167 A * | 8/1992 | Shaar | ............... | G01B 11/26 250/559.22 |
| 5,367,372 A * | 11/1994 | DiVita | ............... | G01B 11/27 356/154 |
| 5,379,112 A * | 1/1995 | Ollivier | ............... | G01B 11/272 356/150 |
| 5,459,564 A * | 10/1995 | Chivers | ............... | G01B 9/04 356/477 |
| 5,632,739 A * | 5/1997 | Anderson | ............... | A61B 18/24 606/15 |
| 5,657,131 A * | 8/1997 | Csipkes | ............... | G02B 6/3843 356/401 |
| 5,729,622 A * | 3/1998 | Csipkes | ............... | G02B 6/3807 356/73.1 |
| 5,829,659 A * | 11/1998 | Mansfield | ............... | G02B 6/25 225/2 |
| 5,854,852 A * | 12/1998 | Csipkes | ............... | G02B 6/3843 382/151 |
| 6,011,616 A * | 1/2000 | Volcy | ............... | G01B 11/272 356/73.1 |
| 6,421,118 B1 * | 7/2002 | Shaar | ............... | G01M 11/088 356/73.1 |
| 6,456,369 B1 * | 9/2002 | Ohki | ............... | G02B 6/3807 356/73.1 |
| 6,710,864 B1 * | 3/2004 | Grant | ............... | G01M 11/35 356/73.1 |
| 6,941,016 B1 * | 9/2005 | Wagman | ............... | G06K 9/4638 382/149 |
| 6,983,065 B1 * | 1/2006 | Akgul | ............... | G06K 9/4619 348/125 |
| 7,110,657 B1 | 9/2006 | Schildmeyer et al. | | |
| 8,538,132 B2 * | 9/2013 | Kessler | ............... | G06T 7/0006 348/94 |
| 9,612,177 B2 * | 4/2017 | Clarke | ............... | G01B 11/14 |
| 9,964,710 B2 * | 5/2018 | Rosson | ............... | G02B 6/385 |
| 9,995,885 B2 * | 6/2018 | Nielson | ............... | G02B 6/3885 |
| 10,353,154 B2 * | 7/2019 | Ott | ............... | G02B 6/381 |
| 2002/0084301 A1 * | 7/2002 | Murgatroyd | ............... | G02B 6/25 225/105 |
| 2005/0109177 A1 * | 5/2005 | Wiley | ............... | G02B 6/25 83/13 |
| 2005/0249462 A1 * | 11/2005 | Alduino | ............... | G02B 6/428 385/49 |
| 2007/0237459 A1 * | 10/2007 | Watte | ............... | G02B 6/322 385/39 |
| 2008/0198370 A1 * | 8/2008 | Cherel | ............... | G01M 11/33 356/73.1 |
| 2011/0146071 A1 * | 6/2011 | Zheng | ............... | G02B 6/2552 29/869 |
| 2012/0301085 A1 * | 11/2012 | Grinderslev | ............... | G02B 6/3887 385/77 |
| 2013/0143248 A1 * | 6/2013 | Fernandez | ............... | G01N 21/01 435/18 |
| 2014/0105547 A1 * | 4/2014 | Baca | ............... | G02B 6/36 385/78 |
| 2014/0226151 A1 * | 8/2014 | Bennett | ............... | G01M 11/3163 356/73.1 |

\* cited by examiner

DEVICES, SYSTEMS AND METHODS FOR USE IN FIBER MEASUREMENTS, SUCH AS MULTI-MODE FIBER GEOMETRY MEASUREMENTS

CROSS-REFERENCE TO RELATED APPLICATION

This application is a National Stage Application of PCT/EP2015/076048, filed on Nov. 9, 2015, which claims the benefit of U.S. Patent Application Ser. No. 62/077,036, filed on Nov. 7, 2014, the disclosures of which are incorporated herein by reference in their entireties. To the extent appropriate, a claim of priority is made to each of the above disclosed applications.

BACKGROUND

Telecommunication links contain increasing numbers of detachable multi-mode optical fiber interconnects. The maximum allowable attenuation per connection has to decrease, which is a motivation for conducting accurate fiber geometry measurements. Using a series of measurements with a transmitted near-field (TNF) method on a commercially available instrument, it has been recognized that the recorded multi-mode fiber geometries vary upon re-cleaving a fiber sample.

Aspects of the present disclosure relate to devices, systems and methods to determine the fiber cleave angle on a general purpose confocal microscope. Other aspects relate to devices, systems and methods along with a model to estimate the true cladding non-circularity and the apparent fiber misalignments in a consistent manner.

There are multiple methods to measure the fiber geometry, comprising the fiber core diameter and non-circularity, the fiber cladding diameter and non-circularity, and core-cladding concentricity. A known method employs the transmitted near-field method (TNF). After a fiber sample of at least 2 meters is cleaved on both ends, one end is illuminated with an LED, and on the other end is measured with a CCD camera detector. A problem with this approach is the poor reproducibility of the measurement after re-cleaving.

SUMMARY

In the present disclosure, a new tool is used which allows rotation of a fiber around its optical axis in front of the camera detector of a commercially available TNF apparatus, to study the behavior of the fiber geometry parameters. The fiber cladding non-circularity reported by the instrument showed a periodic pattern with higher rotation harmonics as the fiber was rotated 360 degrees around its optical axis. A geometric model was created of a fiber and the projection of its perimeter onto a detector plane, taking into account the non-circularity (and orientation) of the fiber, the cleave angle (and orientation), and the angular misalignment (and orientation) of the fiber with respect to the detector. The output of the model is the non-circularity of the perimeter projected on the detector plane. A least-square fit of the model (taking the aforementioned six parameters as input) to at least six measurements of the fiber non-circularity at fixed (known) orientations, allows a user to output the true fiber non-circularity. This method allows improvements in the accuracy and repeatability of the measurement of other fiber geometry parameters. The model-based estimation of fiber alignment and fiber cleave imperfections with the fiber rotation method, allows for more accurate measurements of the fiber cladding diameter and non-circularity. This may be extended to the core diameter and non-circularity as well. This improvement may be of interest to the manufacturers of such equipment. Furthermore, it may be used to measure the fiber misalignment with respect to the instrument, and adjust the instrument accordingly. This improvement is also of interest to fiber manufacturers, and fiber component manufacturers and users.

DETAILED DESCRIPTION

1. Introduction

The optical networks that are deployed in datacenters typically employ multi-mode fibers for a number of reasons. The bandwidth-length product of these fibers have improved significantly over the years and have kept up with the demand for high-speed data transmission over workable distances. The technology to manufacture the active components for these multi-mode fibers, such as the transmitters and receivers, are typically cheaper compared to their single-mode fiber counterparts. Furthermore, the fiber alignment in a connection is typically less demanding in terms of attenuation, dust or defects compared to single-mode fiber connections.

In order to meet the increasing demand for bandwidth, increasing numbers of multi-mode fiber links may be deployed in parallel. In order to manage the backbone of such networks in a structured manner, trunk cables contain large numbers of fibers and are terminated with connectors, for example with the Multi-fiber Push-On (MPO) connector. With the aid of cassettes, the individual fibers in the trunk cable may be rerouted to other connector types, which facilitates the connection to the individual transceivers. With these components, an entire network topology may be configured in a flexible and structured manner, albeit that there are multiple interconnects in each link.

Figure 1:
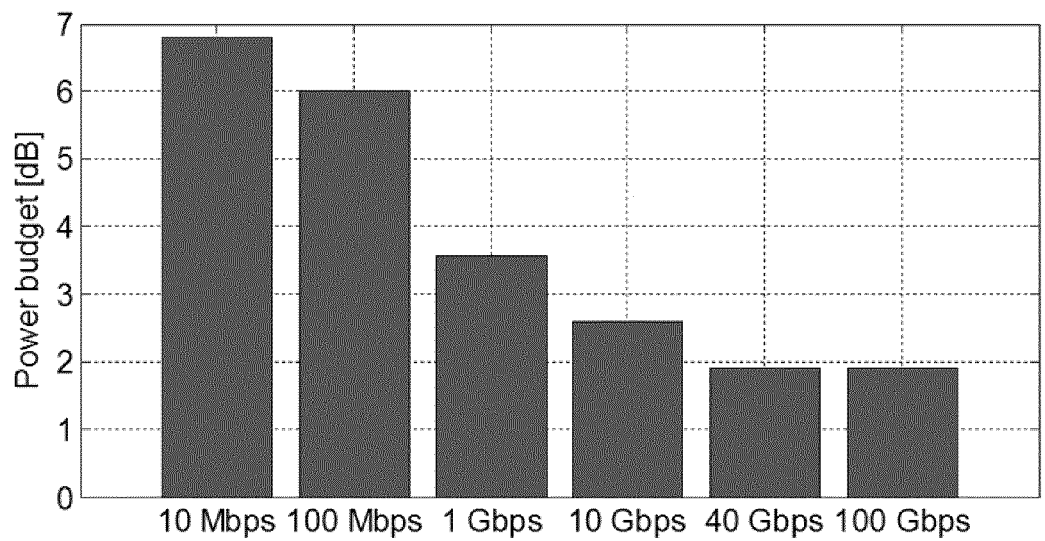
FIG. 1 illustrates a relationship between the available link power budget and data rates; the available link power budget decreases with increasing data rates.

As data rates increase, the available link power budget decreases rapidly, as shown in FIG. 1. The challenge is to meet the power budget, without sacrificing the transmission distance or the ability to provide multiple interconnects in each link. Therefore, the maximum allowed attenuation per connector should be decreased. To reduce the fiber intrinsic contributors to attenuation, the tolerances on fiber geometry parameters, as regards the core diameter and the numerical aperture, can be tightened.

Methods to measure the core diameter include the transmitted near-field (TNF) method, the refractive near-field (RNF) method and the transverse interferometric (TI) method. The latter two methods aim to measure the shape of the refractive-index profile directly, whereas the first method measures the near-field at the end of the fiber when excited using an overfilled launch (OFL).

Figure 16:
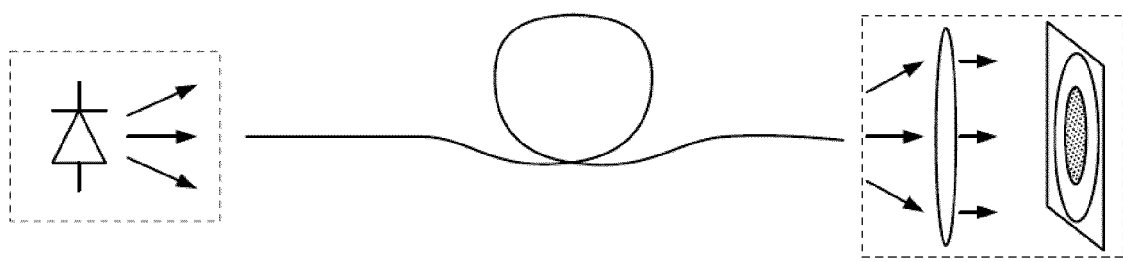
FIG. 16 schematically illustrates a TNF imaging setup.
Figure 17:
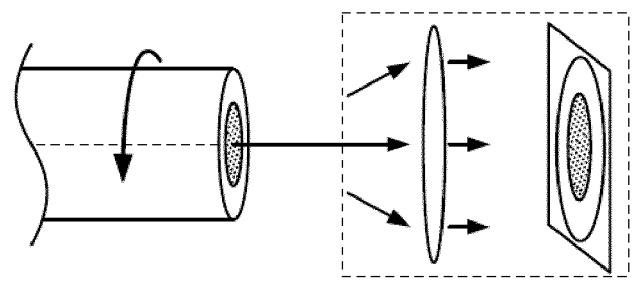
FIG. 17 schematically illustrates orienting an optical fiber at different rotational angles by rotating the fiber about its optical axis.

The TNF method is one preferred method for fiber geometry measurements, because it is typically less labor intensive and less time consuming compared to an RNF measurement. Fiber geometry parameters, including the fiber outer (cladding) diameter and non-circularity, the fiber core diameter and non-circularity, and core-cladding concentricity can be obtained from a single TNF measurement. After stripping away the coating on both ends of a sample of typically 2 meters, the bare fiber is cleaved on both ends and inserted in the measurement apparatus. An 850 nm light emitting diode (LED) couples light into the fiber core, and the other end of the fiber is projected onto a CCD camera. Under ideal circumstances, a single image of the illuminated fiber end-face is sufficient to determine the fiber geometry parameters. A TNF imaging setup is schematically illustrated in FIG. 16.

However, upon re-cleaving the fiber, the outcome of a TNF geometry measurement may vary. This variation on the core diameter measurement may indeed easily attain several tenths of a micrometer. For every new measurement, the fiber is repositioned in the fixture after the coating around the protruding fiber was stripped, and the bare fiber is re-cleaved. A mechanical tool that replaces the standard tool of the fiber geometry apparatus, allows a user to rotate the fiber around its optical axis. A measurement method determines the end-face angle relative to the optical axis of the fiber, as well as the angular misalignment of the fiber with respect to the tool.

The recorded cladding non-circularity depends on the orientation of the fiber with respect to the optical axis of the instrument. With the aid of a model, several factors play a role in the observed variation in cladding non-circularity. Even for circular fibers, the combination of a finite cleave angle, and either an angular misalignment of the tool with respect to the optical axis, or an improper calibration of the two Cartesian camera axes of the instrument, or both, will result in an apparent orientation-dependent cladding non-circularity. On top of that, the fiber may actually be non-circular, causing a higher rotation angle harmonic to become apparent.

With measurements for various cleaves, consistent results are obtained for the true cladding non-circularity, and apparent tool misalignment on the instrument (or instrument miscalibration). For all these measurements, the launch into the fiber was left unchanged. Besides the effect of rotating the fiber at the camera-side, there may also be an effect of changing the fiber bend radius on the recorded core diameter.

2. Fiber Geometry Measurements

Figure 2:
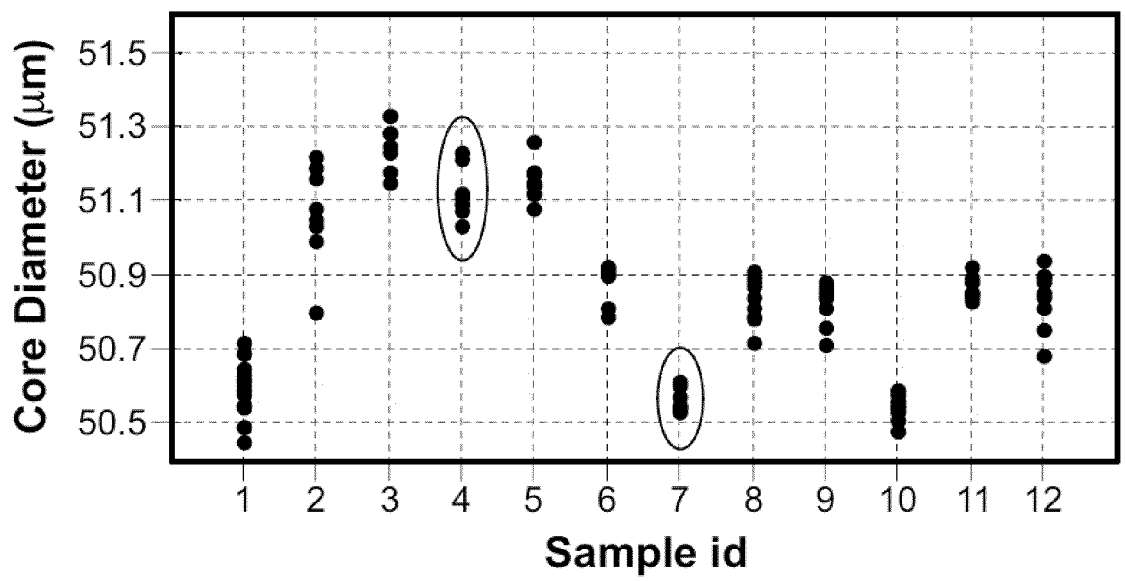
FIG. 2 shows recorded variation in core diameter over several samples.

A fiber sample is aligned in the TNF measurement apparatus. While keeping the tool and cleave on the LED-side untouched over all subsequent measurements, measurements were made on the receiving side in nine orientations, from zero degrees with steps of 45 degrees to 360 degrees. The resulting recorded core diameters are shown in FIG. 2, for twelve cleaves on the receive side.

Figure 3:
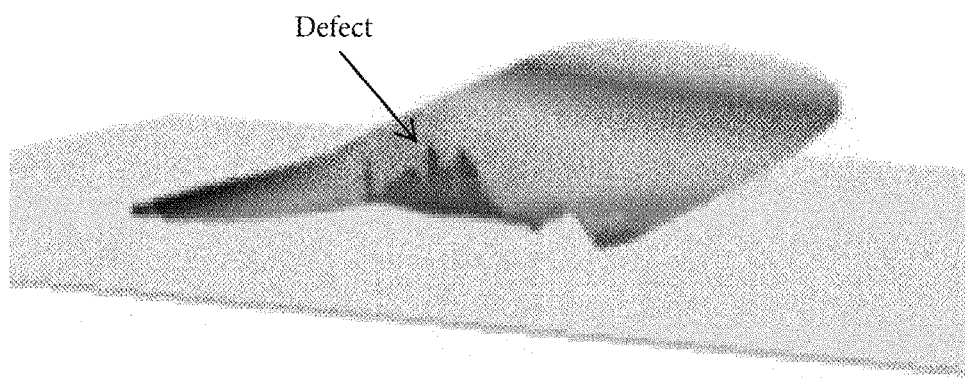
FIG. 3 shows an example of a confocal measurement of a cleaved fiber end-face viewed from the side.

For each cleave and each orientation, the fiber geometry parameters were measured. The TNF core diameter is defined as the diameter obtained after fitting an ellipse to the measured contour at a 2.5% intensity level. The non-circularity is then defined by, $$nc\ [\%] = 100\frac{D_{max} - D_{min}}{D_{mean}}, \qquad (1)$$

where nc denotes the non-circularity, $D_{max}$ and $D_{min}$ the major and minor axes of the fitted ellipse, and $D_{mean}$ is the TNF core diameter. After a sample was measured, the fiber was directly cut behind the tool, so that it can be moved to a general purpose confocal microscope, while maintaining the reference to the orientation. An example of a scan is shown in FIG. 3. It clearly shows a spiky shaped defect at the front-edge where the cleave is initiated. A plane was fitted through every measured end-face surface. Although the shape may not seem to be represented well by a plane, it must be noted that the image is not displayed to scale. The plotted height difference (measured with respect to the optical axis of the microscope) is less than 2.5 µm for this example, whereas the diameter is 125 µm. With the aid of at least two scans with known rotation (about the fiber axis), one can discriminate between the cleave angle and orientation with respect to the cross-sectional plane, and the angle (and orientation) of the fiber axis with respect of the optical axis of the microscope. Scans of four orientations were collected, which gives six permutations resulting in a cleave angle (and orientation) and fiber-tool misalignment (and orientation). The average of these outcomes was used for the estimate of the cleave angle (and orientation). The standard deviation of the cleave angle is smaller than 0.05 degrees, but usually better. The misalignment of the fiber axis with respect to the microscope was about 0.1 degrees.

Figure 4:
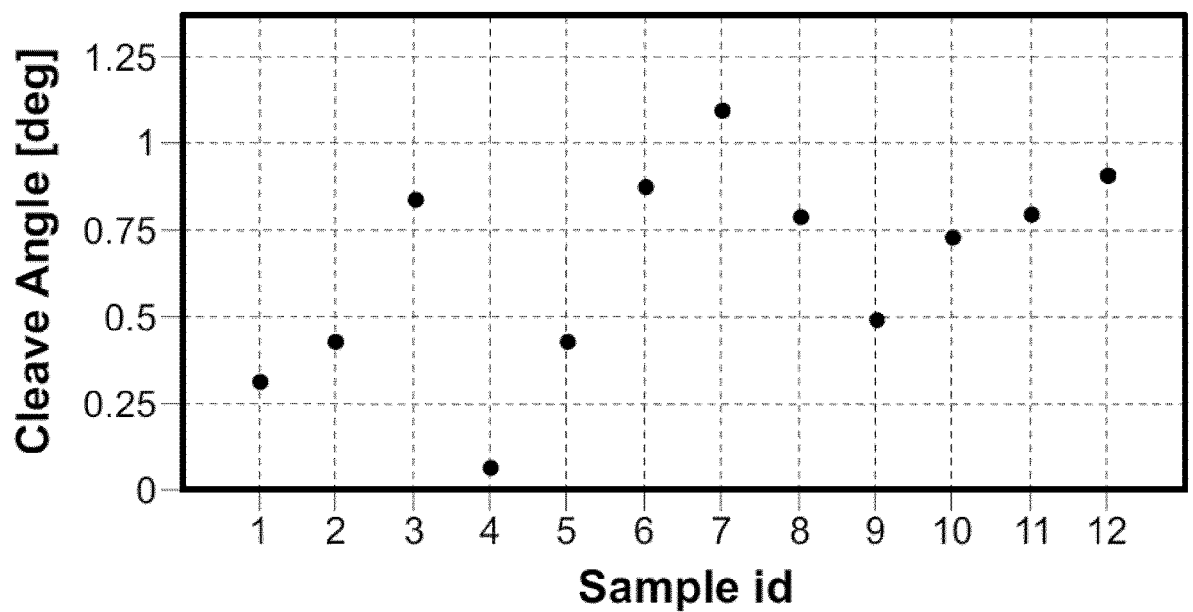
FIG. 4 shows cleave angle measurements over several samples.

In this example, the cleave angles are often as large as 1 degree. The resulting cleave angles for twelve samples are shown below in FIG. 4.

The cleave angle of sample four is small, and this sample will prove very useful for the analysis. Furthermore, comparing FIGS. 2 and 4, there seems to be no straightforward connection between the cleave angle and the recorded variation in the core diameter. For instance, sample four does not show a smaller variation in recorded core diameter than sample seven in FIG. 2.

In a fashion similar to the cleave angle measurement, the fiber inside the tool was rotated, but now on the commercially available TNF measurement apparatus. The motivation for that is that if standard fixtures are used, the fiber may be misaligned with the instrument, which would be difficult to determine.

Figure 5:
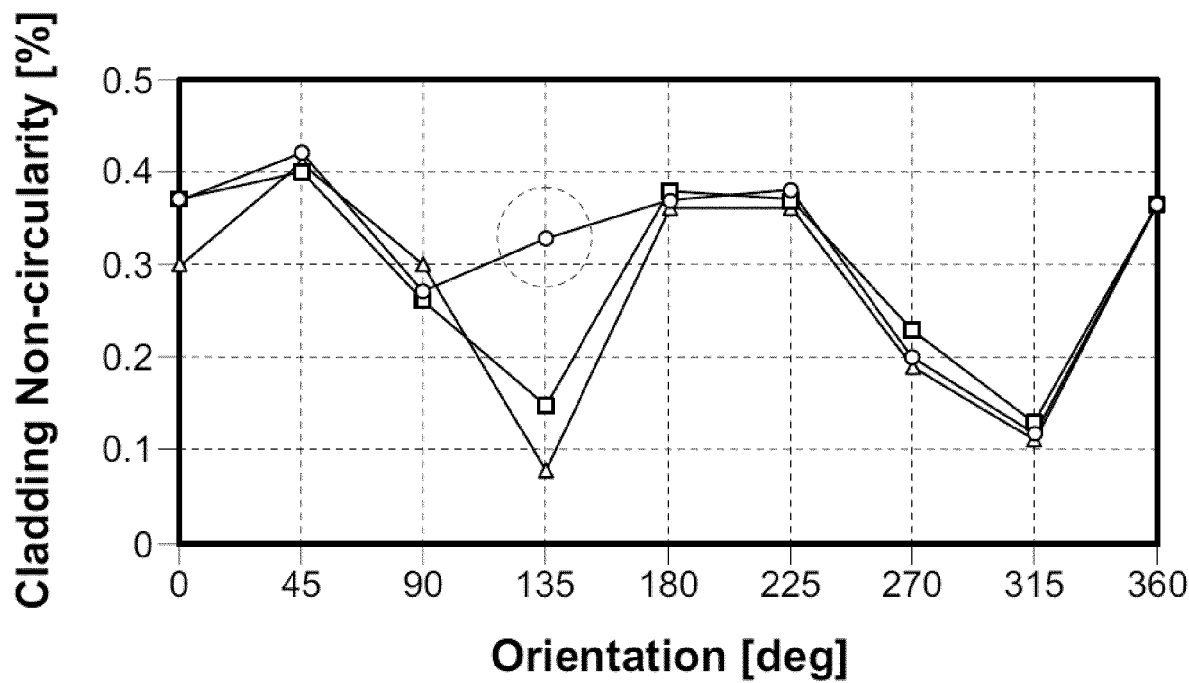
FIG. 5 show measurements of cladding non-circularity as function of the orientation; the measurements show repeatability in orientational dependency.

The recorded cladding non-circularity was periodic with the orientation of the fiber in the fixture. Although the non-circularity is small, the measurement was quite repeatable, as shown in FIG. 5 below, for which the fiber was rotated three times.

Apart from the clear outlier at 135 degrees, measurement method is repeatable.

3. Model-Based Data Interpretation

To make a general description of the perimeter of the fiber cladding, a parametric description of an ellipse with a non-circularity and orientation was used. The cleave angle and cleave orientation is accounted for by taking an appropriate cross-section. The angularly misaligned fiber with respect to the camera is modeled by projecting the cross-section onto the detector plane. A misconfiguration of the two magnification factors of the Cartesian axes of the detector may also lead to an apparent non-circularity, and this may be accounted for by an appropriate scaling along the detector axes. However, in this example, there is no intention to discriminate between tool misalignment and the detector miscalibration, the example uses unit scaling factors and assumes the system is calibrated.

Figure 6:
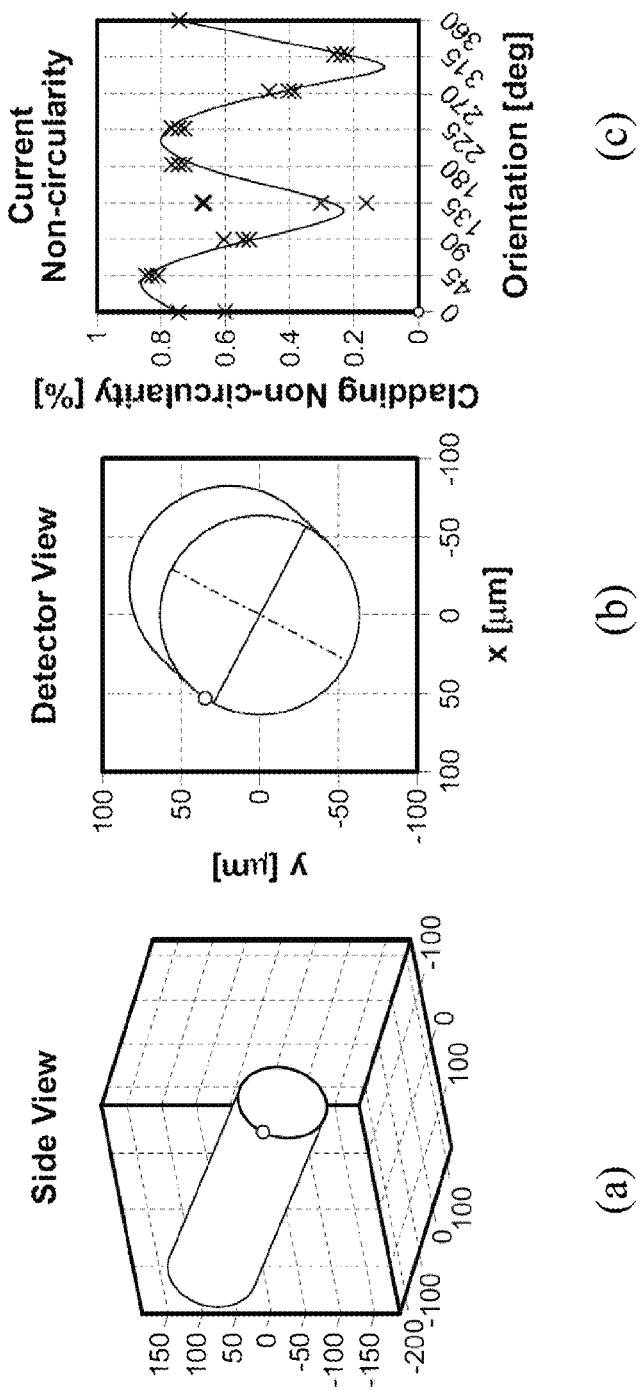
FIG. 6 illustrates (a) a perspective (side) view of a cleaved fiber, (b) view of the cleaved fiber from the TNF detector, and (c) a least-squares fit between a model (line) and the measured data (crosses) for the cleaved fiber according to an aspect of the present disclosure.
Figure 10:
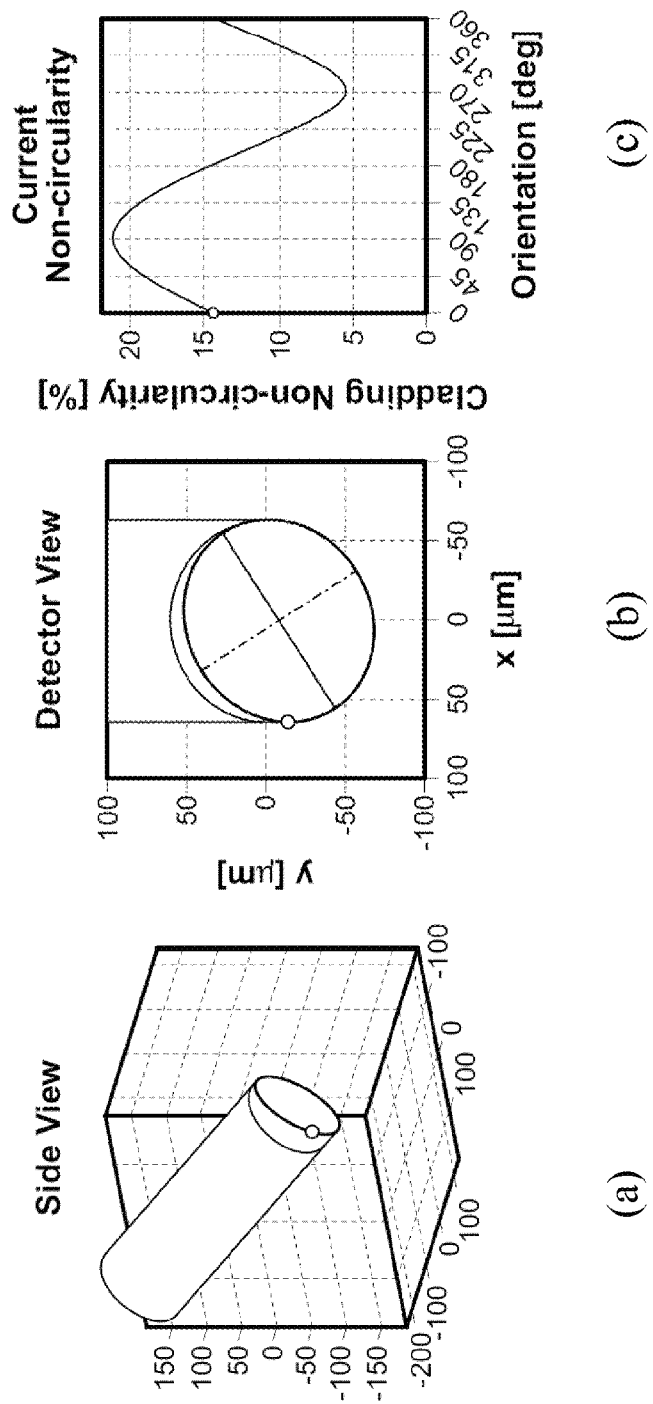
FIG. 10 illustrates (a) a perspective (side) view of a cleaved fiber, (b) view of the cleaved fiber from the TNF detector, and (c) values, as predicted by the model, of clad non-circularity as a function of fiber orientation for a combinations of zero actual clad non-circularity, non-zero cleave angle and non-zero fiber angular misalignment.
Figure 11:
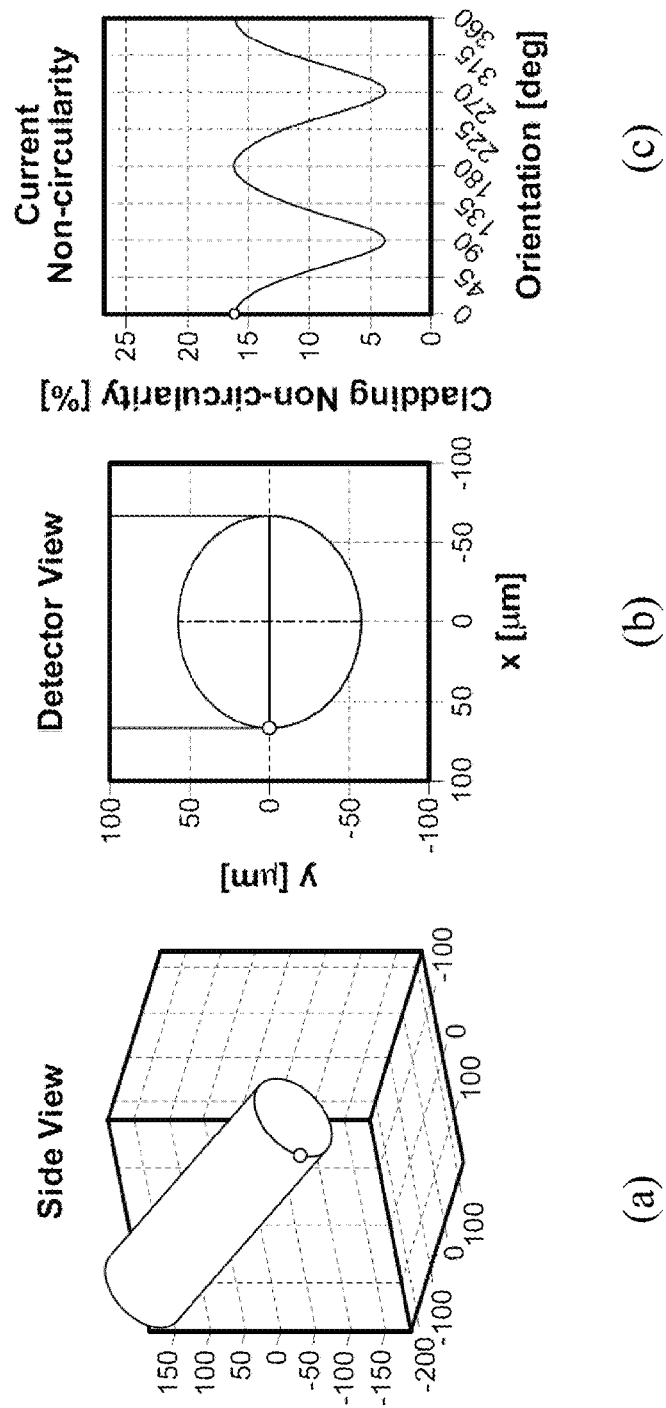
FIG. 11 illustrates (a) a perspective (side) view of a cleaved fiber, (b) view of the cleaved fiber from the TNF detector, and (c) values, as predicted by the model, of clad non-circularity as a function of fiber orientation for a combinations of non-zero actual clad non-circularity, zero cleave angle and non-zero fiber angular misalignment.
Figure 12:
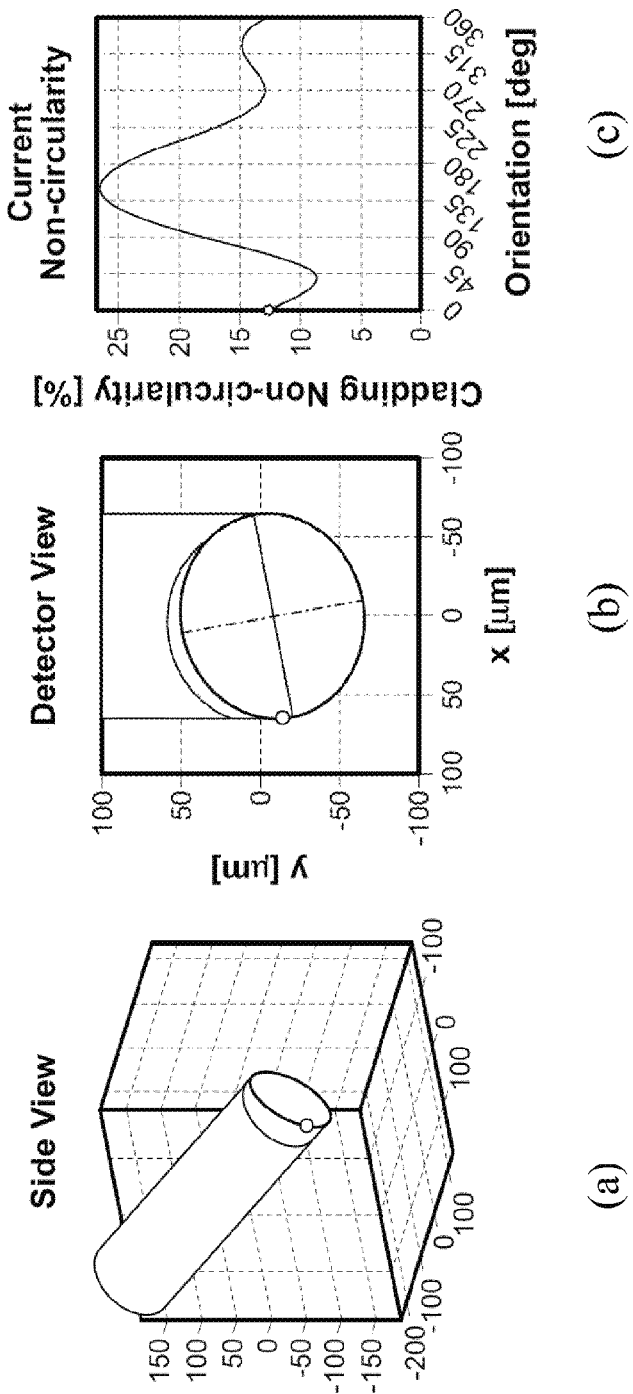
FIG. 12 illustrates (a) a perspective (side) view of a cleaved fiber, (b) view of the cleaved fiber from the TNF detector, and (c) values, as predicted by the model, of clad non-circularity as a function of fiber orientation for a combinations of non-zero actual clad non-circularity, non-zero cleave angle and non-zero fiber angular misalignment.

In case the fiber is perfectly circular, the rotation of the fiber only leads to a change in the recorded cladding non-circularity when there is a non-zero cleave angle and a tool misalignment. This would lead to one period in 360 degrees as shown by the dashed curve in FIG. 10(c). In case the fiber also has a finite cladding non-circularity, a second rotation angle harmonic becomes apparent as shown by the solid curve, as shown by the example in FIG. 6(c). (FIG. 6 also illustrates (a) a perspective (side) view of a cleaved fiber, (b) view of the cleaved fiber from the TNF detector.)

In this case, the true cladding non-circularity is found to be 0.16%. The peak-to-through amplitude is due to a tool misalignment of about two degrees and a finite cleave angle. Given that a 0.16% non-circularity in equation (1) amounts to an orientation dependent diameter of 125+0.10 μm, the true cladding non-circularity is consistently measureable by this approach. Even though this cladding non-circularity is very small, from a connector manufacturing standpoint it is the maximum dimension that may pose difficulties inserting the fiber into a connector ferrule.

Figure 7:
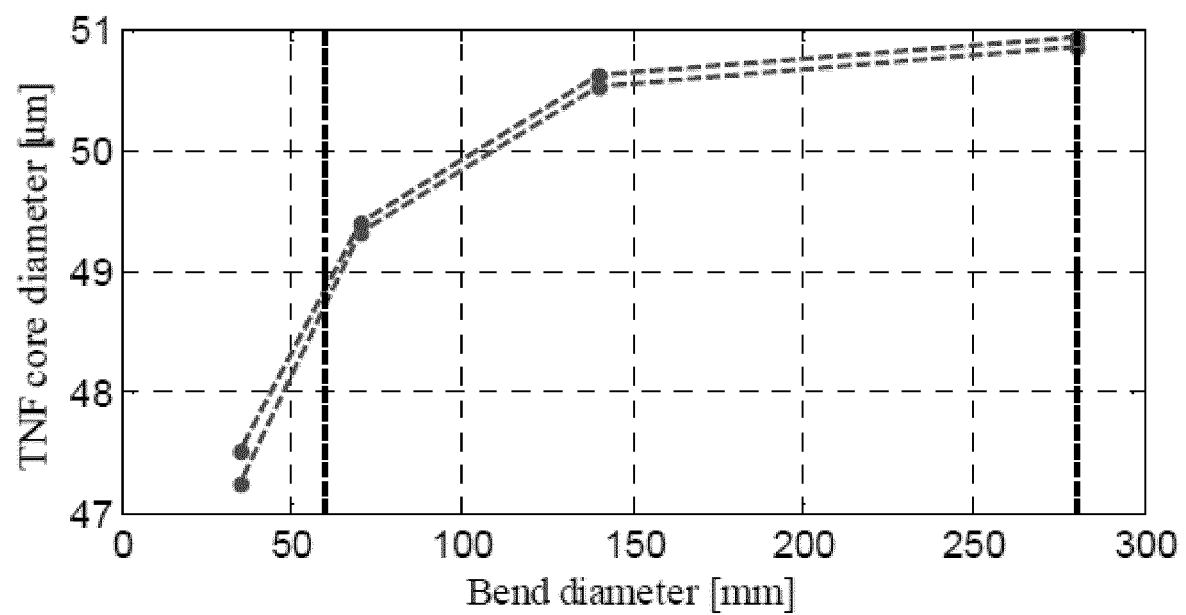
FIG. 7 is a plot showing impact of fiber bend on core diameter as measured by the TNF method.
Figure 8:
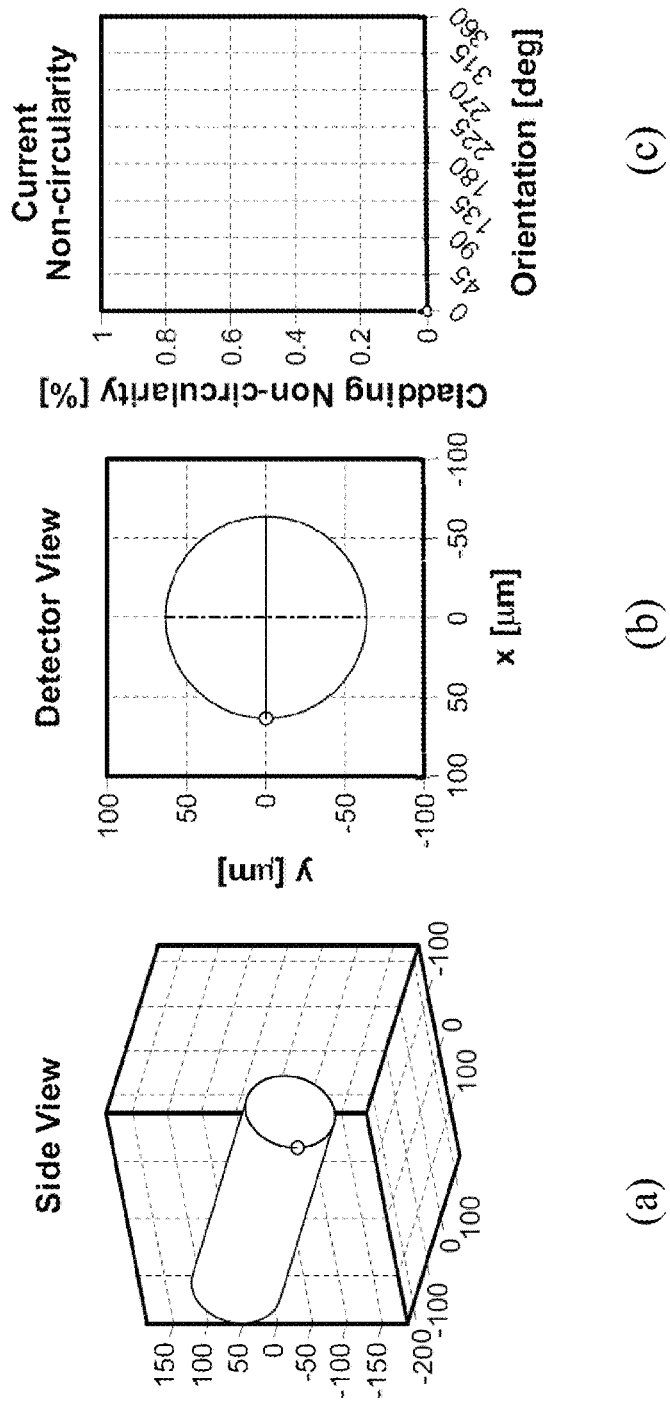
FIG. 8 illustrates (a) a perspective (side) view of a cleaved fiber, (b) view of the cleaved fiber from the TNF detector, and (c) values, as predicted by the model, of clad non-circularity as a function of fiber orientation for a combinations of zero actual clad non-circularity, zero cleave angle and zero fiber angular misalignment.
Figure 9:
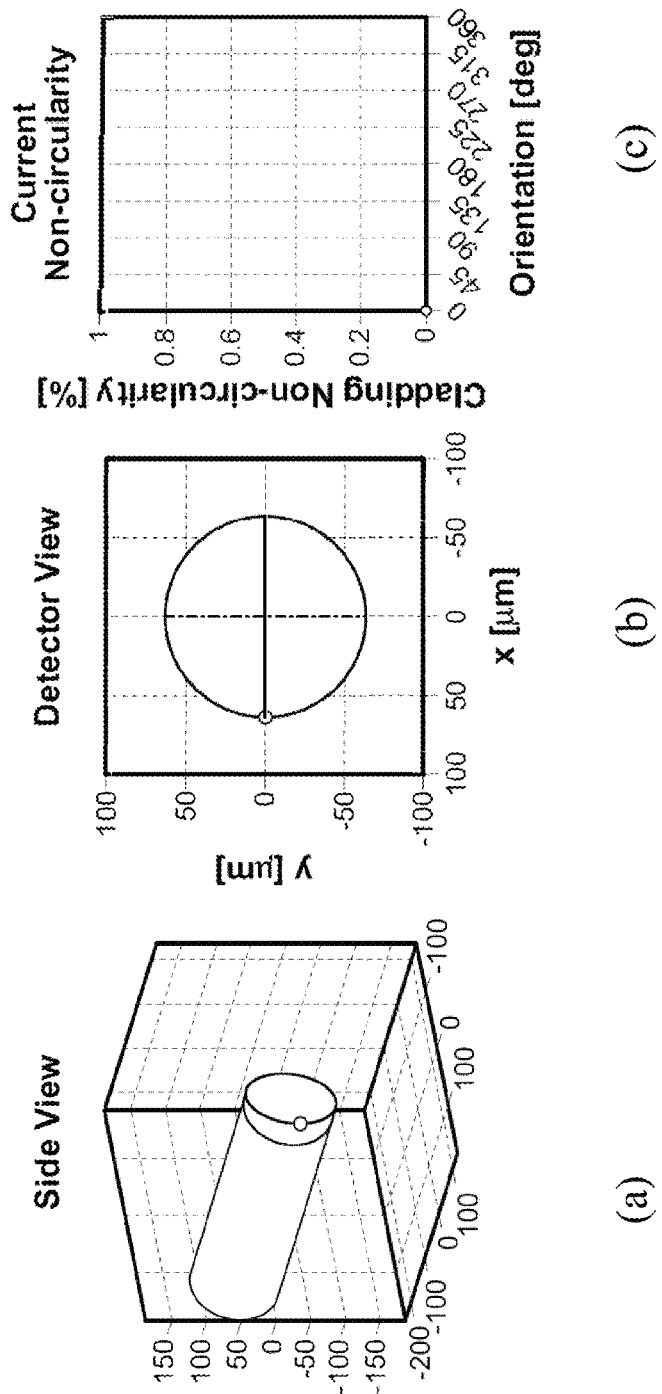
FIG. 9 illustrates (a) a perspective (side) view of a cleaved fiber, (b) view of the cleaved fiber from the TNF detector, and (c) values, as predicted by the model, of clad non-circularity as a function of fiber orientation for a combinations of zero actual clad non-circularity, non-zero cleave angle and zero fiber angular misalignment.

In order to align the two meter fiber sample with the receptacles on the instrument, the fiber may have to be bent. The bend radius may have an impact on the recorded core diameter of a multi-mode fiber. In one experiment a bend diameter of 280 mm in diameter, which coincides with a marking on the instrument, indicated with a dashed line in FIG. 7. We subsequently reduced the bend diameter by a factor two, while keeping the arc length the same. The TNF core diameter reduces rapidly when the bend diameter reduces. In the first step, the diameter reduced by 0.3 μm. In the second step, this is already more than a micrometer, although the diameter of that bend is still larger than the inner-marking on the instrument. There is no mentioning of the bend diameter in the fiber geometry standard, but possibly this should be accounted for, in order to perform reliable measurements.

When a multi-mode fiber is bent, the high-order modes tend to leak into the cladding, which affects the measured near-field pattern.

Additional examples of modelling the apparent (measured) fiber characteristics are given in FIGS. 8-12. Each of FIGS. 8-12 illustrates (a) a perspective (side) view of a cleaved fiber and (b) view of the cleaved fiber from the TNF detector. In FIG. 8(c), values of apparent clad non-circularity, as predicted by the model, as a function of fiber orientation are shown for a combinations of zero actual clad non-circularity, zero cleave angle and zero fiber angular misalignment. As expected, the values are zero regardless of fiber orientation.

FIG. 9(c) illustrates values, as predicted by the model, of apparent clad non-circularity as a function of fiber orientation for a combinations of zero actual clad non-circularity, non-zero cleave angle and zero fiber angular misalignment. Again, the values are zero regardless of fiber orientation.

FIG. 10(c) illustrates values, as predicted by the model, of clad non-circularity as a function of fiber orientation for a combinations of zero actual clad non-circularity, but instrumental imperfections, with non-zero cleave angle (in this case 20°) and non-zero fiber angular misalignment (in this case 20°). The apparent clad non-circularity exhibits a single period of variation per revolution of the fiber.

FIG. 11(c) illustrates values, as predicted by the model, of apparent clad non-circularity as a function of fiber orientation for a combinations of non-zero actual clad non-circularity (in this case 10%), zero cleave angle and non-zero fiber angular misalignment (in this case 20°). The apparent clad non-circularity exhibits a higher harmonic variation, i.e., with a component of multiple cycles variation in apparent clad non-circularity per revolution of the fiber.

FIG. 12(c) illustrates values, as predicted by the model, of apparent clad non-circularity as a function of fiber orientation for a combinations of non-zero actual clad non-circularity (in this case 10%), non-zero cleave angle (in this case 20°) and non-zero fiber angular misalignment (in this case 20°). Similar to the case demonstrated in FIG. 11, the apparent clad non-circularity exhibits a higher harmonic variation.

It is noted that the method described above not only yields the actual fiber characteristics (e.g., clad non-circularity) but also instrumental imperfections (e.g., cleave angle and fiber angle misalignment). In the example shown in FIG. 6, in addition to obtaining the true clad non-circularity of 0.16%, the method further found the cleave angle (0.28°) and fiber angle misalignment (4°). It is additionally noted that the fiber characteristics (e.g., clad non-circularity) obtained by this method is typically different from the mere average over all measurements. For example, the average value of clad non-circularity is approximately 0.26, but the true clad non-circularity is about 0.16.

4. Conclusions

Through a series of experiments on a commercially available TNF measurement apparatus, it was revealed the various causes of variation in the recorded core diameter. This is most apparent when the fiber sample is subjected to re-cleaving. Moreover, it was observed that a periodic behavior in the recorded cladding non-circularity occurred when the fiber was rotated. With a model, a user is able to measure the true cladding non-circularity, as well as a fiber misalignment on the instrument in a consistent manner. Furthermore, it was found that a fiber bend does have an impact on the recorded TNF core diameter.

Figure 13:
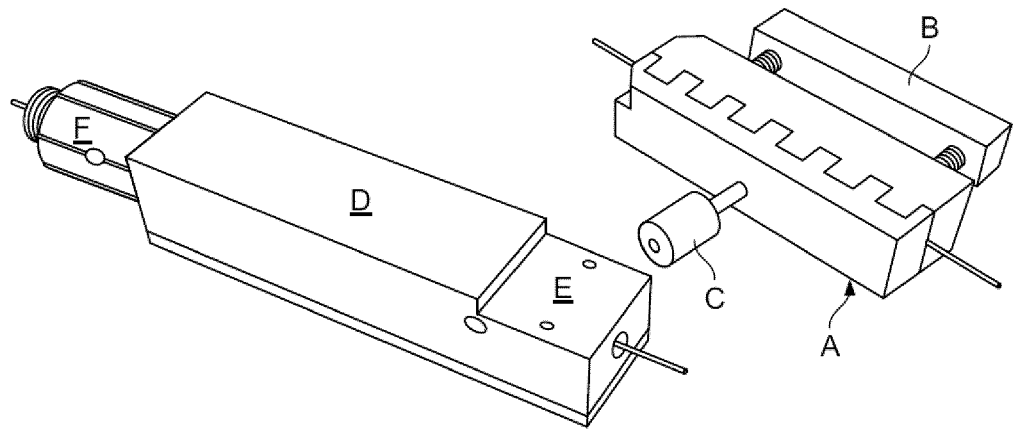
FIG. 13 shows an example of a clamp for holding an optical fiber in TNF measurements, and a fiber rotation tool.
Figure 14:
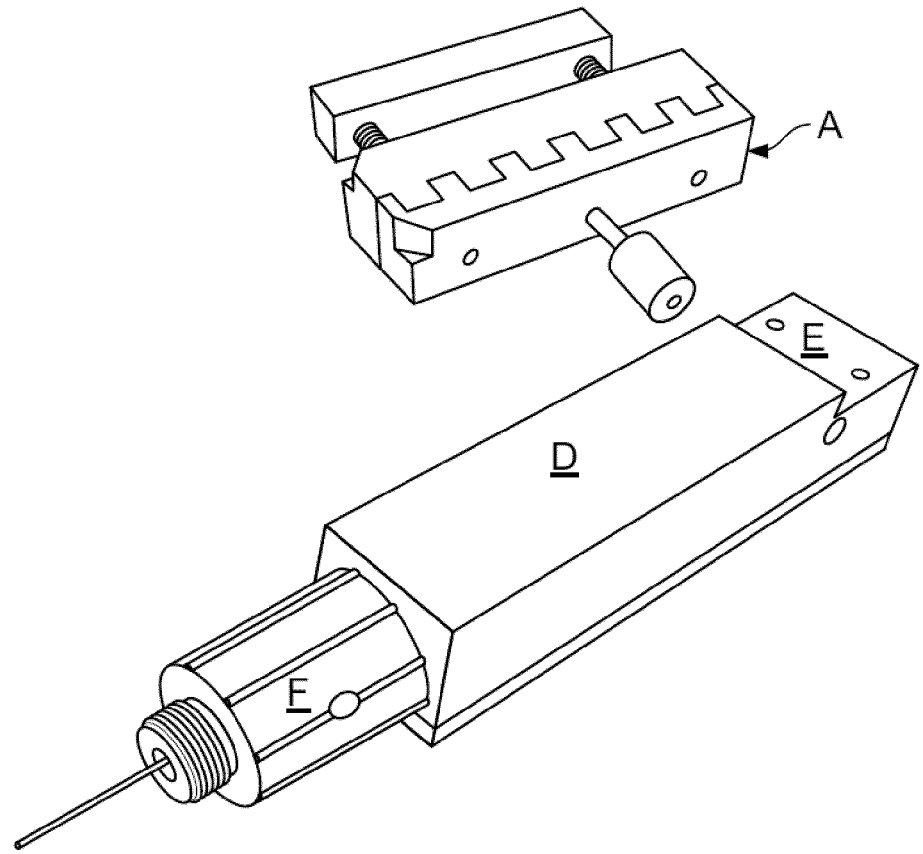
FIG. 14 shows another view of the clamp shown in FIG. 13.
Figure 15:
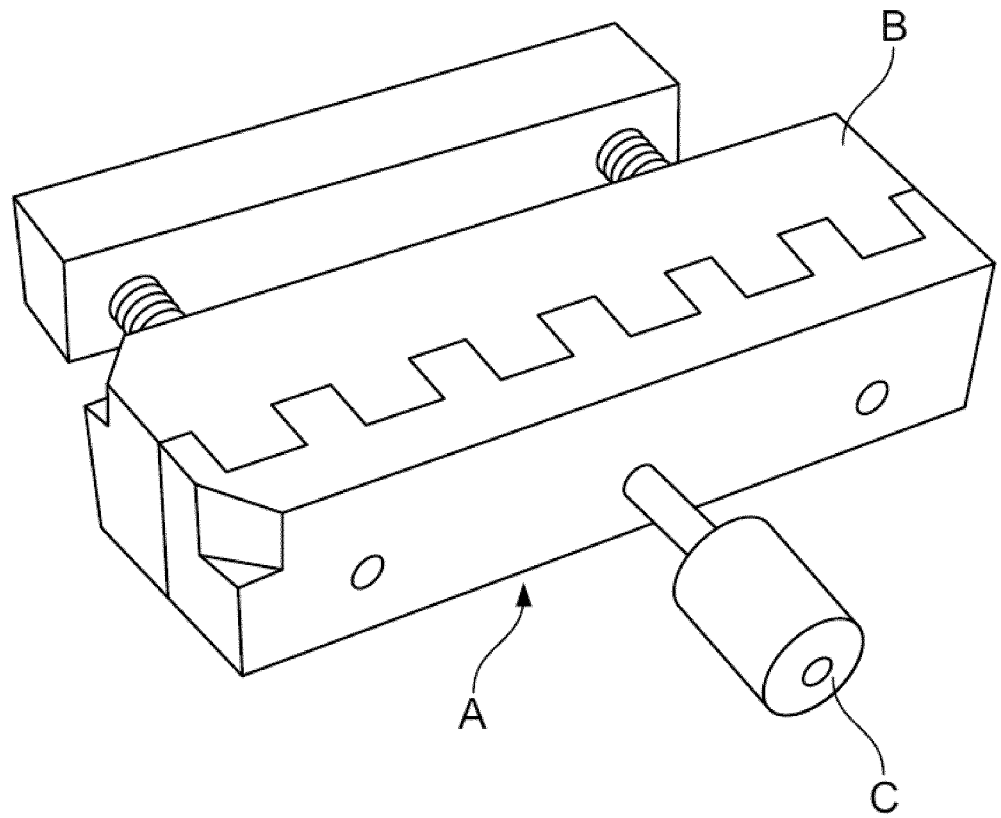
FIG. 15 show another view of the fiber rotation tool shown in FIG. 13.

FIGS. 13-15 show an example for a tool that allows fiber rotation during measurement of the fiber. A standard clamp A that comes with a known TNF apparatus. It has a V-groove block B to align the fiber, and two springs are used to push the V-groove block to the mechanical stop to keep the fiber locked in the V-groove. With the knob C, one can push the V-groove block away from the mechanical stop, and insert (or remove) the fiber from the clamp. This standard tool can be used on the LED-side of the apparatus, where the light is coupled into the fiber.

FIGS. 13 and 14 show an example rotation tool D that can be used on the camera side of the apparatus. These Figures show an aluminum block E that contains a ferrule. The end-face of the circular ceramic ferrule is visible at the front-end of the block. The block also contains the mechanical part that holds on to the fiber and allows a user to rotate the fiber. Because the fiber fits inside in the narrow ferrule bore, the protruding part of the fiber can only rotate around its own axis. The fiber is thus rotated inside the ferrule bore. The rear-view shows the part F that facilitates the rotation. It shows the markings that may allow to keep track of the orientation of the fiber. The aluminum block itself is thus kept untouched in the apparatus throughout the measurements. Like the standard tool, it has a magnetic fixation to the instrument. Although the markings on the part that rotates the fiber allow tracking of the orientation, it is also possible to follow the orientation of some small but noticeable defect or contamination on the cladding contour from the detector camera image. Other devices can be used to permit fiber only rotation, including V-groove devices.

The ferrule in the example tool D is similar to, or identical to, a ferrule used in a fiber optic connector, like an SC connector.

Thus, a method of efficient and accurate measurement and quantification of imperfections in optical fiber as well as instrumental imperfections has been achieved according to the present disclosure. Because many embodiments of the invention can be made without departing from the spirit and scope of the invention, the invention resides in the claims hereinafter appended.

We claim:

1. A method for testing optical fibers, comprising:
   cleaving an optical fiber having a fiber axis to produce a cleaved end surface orientated in a direction forming a cleave angle from the fiber axis;
   measuring, by measuring an optical signal emerging from the cleaved end surface using an optical testing instrument, values of a characteristic of the optical fiber at a plurality of angles of rotation of the optical fiber generally around the fiber axis to generate from the measurements a plurality of data points indicative of measured values of the characteristic as a function of angle of rotation;
   creating a model of the optical fiber having the characteristic as a first variable parameter, having as a second variable parameter an instrumental quantity relating to the testing instrument, the instrumental quantity comprising a value of an angular alignment between the fiber and the instrument, and having as a third variable parameter value of the cleave angle;
   generating from the model a functional relationship between an expected measured value of the characteristic and the angle of rotation, the first variable parameter, the second parameter, and the third parameter;
   varying the first, second and third parameters and to fit the functional relationship to the data points according to one or more predetermined criteria; and
   determining the value of the characteristic, the value of the angular alignment between the fiber and the instrument, and the angle between the orientation of the cleaved end surface and the fiber axis based on the fit.

2. The method of claim 1, wherein the varying the first, second and third parameters to fit the functional relationship to the data points comprises minimizing a mathematical norm of the difference between the functional relationship and the data points.

3. The method of claim 2, wherein the minimizing a mathematical norm comprises performing a least-square fit of the functional relationship to the data points.

4. The method of claim 1, wherein the measuring a characteristic of an optical fiber comprises measuring fiber core diameter or non-circularity, fiber cladding diameter or non-circularity, or core-cladding concentricity.

5. The method of claim 1, wherein measuring a characteristic of the optical fiber comprises illuminating the end surface from within the fiber, and forming an image of the end surface.

6. The method of claim 5, wherein the measuring a characteristic of an optical fiber comprises measuring fiber core diameter or non-circularity, fiber cladding diameter or non-circularity, or core-cladding concentricity.

7. The method of claim 5, wherein the forming an image of the end surface comprises using transmitted near-field microscopy.

8. The method of claim 7, wherein the measuring a characteristic of an optical fiber comprises measuring fiber core diameter or non-circularity, fiber cladding diameter or non-circularity, or core-cladding concentricity.

9. The method of claim 1, wherein the determining the value of the optical fiber characteristic comprises determining that the value is non-zero if the variation of the measured value of the characteristic with the angular rotation contains a component varying with a shorter periodicity than the angular rotation.

* * * * *